No. 730,942. PATENTED JUNE 16, 1903.
J. F. MAYES.
MAP.
APPLICATION FILED AUG. 4, 1902.
NO MODEL.
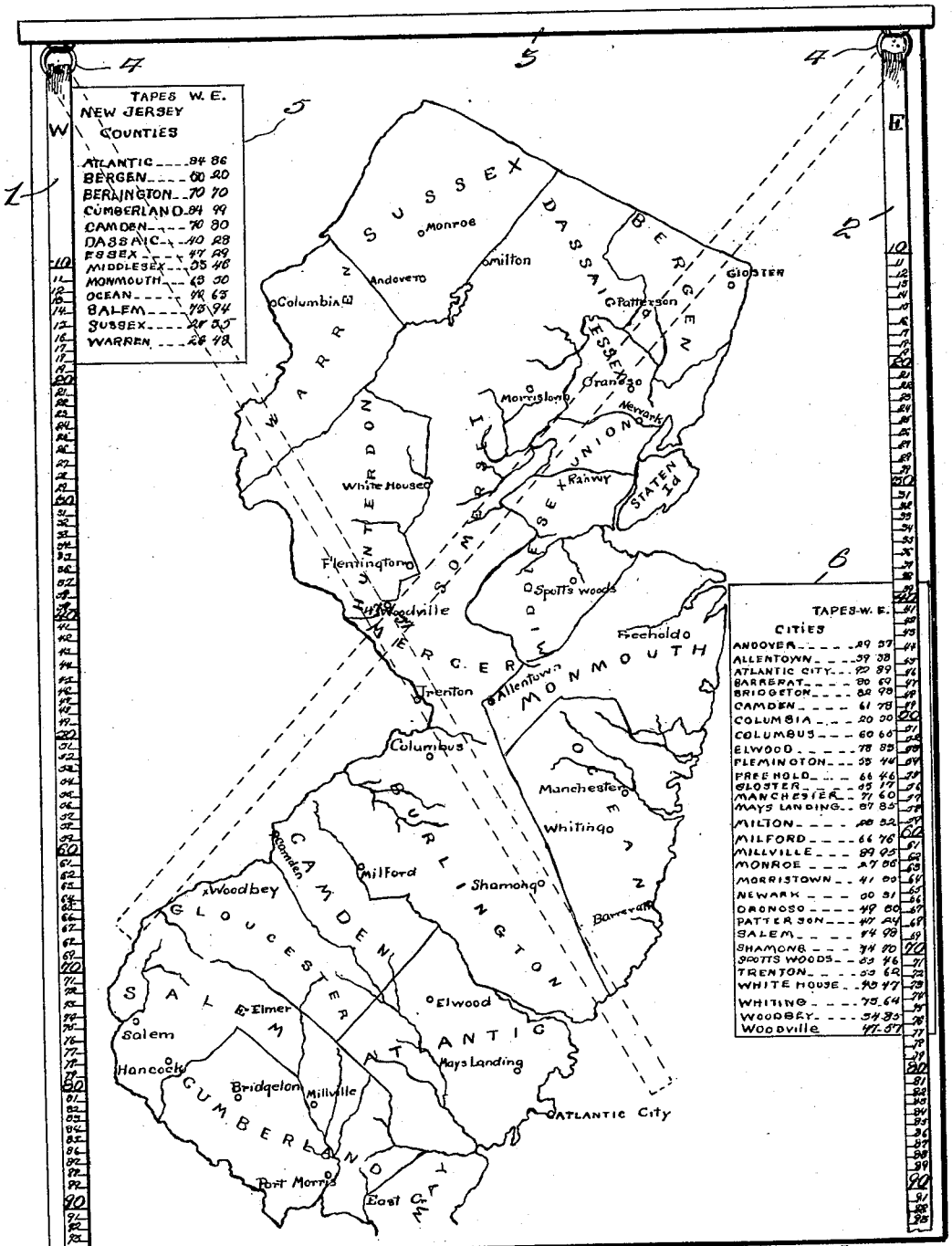

No. 730,942. Patented June 16, 1903.

UNITED STATES PATENT OFFICE.

JOHN F. MAYES, OF HILLSBORO, TEXAS.

MAP.

SPECIFICATION forming part of Letters Patent No. 730,942, dated June 16, 1903.

Application filed August 4, 1902. Serial No. 118,350. (No model.)

*To all whom it may concern:*

Be it known that I, JOHN F. MAYES, a citizen of the United States, residing at Hillsboro, in the county of Hill and State of Texas, have invented a new and useful Map, of which the following is a specification.

This invention relates to maps.

The object of the invention is in a ready, simple, thoroughly feasible and practical manner, and with accuracy and rapidity to locate any desired point on a map.

With these and other objects in view, as will appear as the nature of the invention is better understood, the same consists in the novel location-indicating attachment for a map, as will be hereinafter fully described and claimed.

In the accompanying drawing, forming a part of this specification, and in which like numerals of reference indicate corresponding parts, there is illustrated one form of embodiment of the invention capable of carrying the same into practical operation, it being understood that the elements therein exhibited may be varied or changed in minor matters of detail without departing from the spirit thereof, and in this drawing the figure is a view in plan of a map equipped with the improvement of this invention.

As is well known, many devices have been invented for the same purpose as that of the present invention; but an objection inherent to all of them is that additional matter has to be included on the map, generally in the nature of marginal letters or figures, which increases the cost of production of the map to such an extent as to render the adoption of the attachment objectionable. A further objection to such arrangements is that in most instances the location of a point on a map requires a greater stretch of the arms than is possible with the average person. Under the arrangement of the location-indicator constituting the present invention all of these objections are overcome, and a person can with certainty and ease locate any point on a map that may be desired.

Referring to the drawing, A designates in this instance a map of a portion of the State of New Jersey, the same having indicated thereon certain of the counties and one or more of the principal cities or towns in each of said counties. The small area exhibited on this map is furnished merely for the purpose of rendering clear an understanding of the invention, it being understood that the location-indicator is equally well adaptable to a map, say, of the United States or of Europe, and as this will be readily understood detailed illustration thereof is deemed unnecessary.

Connected with the upper corner on each side of the map and in such manner as to permit ready movement through the arcs of circles are two location-indicators 1 and 2, respectively, the indicator 1 bearing the letter "W" to indicate the west side of the map and the indicator 2 bearing the letter "E" to indicate the east side of the map. These indicators are laid off in numbered divisions, beginning, say, with the number "10" and running up as high as may be necessary in order to render them operable in connection with a map of any given size. As herein shown, the connection between the batten 3 of the map and the indicators is effected through rings 4; but it is to be understood that the precise manner in which the connection is effected is immaterial and may be carried out in other ways than that shown.

The map bears two tables 5 and 6, respectively, and upon the table 5 are arranged the names of the counties in the State, together with the numbers to be combined on the two indicators to determine the location of the county sought, the numbers being arranged in two columns, headed, respectively, "W" and "E," these referring to the indicator on the west and on the east side of the map. Upon the table 6 are arranged the names of the cities in the different counties of the State, together with the numbers to be combined on the two indicators to determine the location of the city or town sought, the numbers being arranged in two columns, headed, respectively, "W" and "E," these, as above stated, referring to the indicator on the west and on the east side of the map. The tables may be separately printed and pasted on the map in the positions shown or otherwise, or they may be printed on the map itself; but where the indicators are to be attached to a map already printed the tables will be pasted thereto.

The indicators may be made of any suitable material—such as tape, metal, or wood—it being immaterial of what particular substance they are constructed to enable them to carry out the functions for which they are designed.

The operation of the indicators in locating a point on the map is as follows: Suppose it be desired to locate, say, Woodville, this being the name of a city or town. Upon referring to the table 6 it will be found that it will be necessary to register the division-marks opposite 47 on the "W" indicator and 57 on the "E" indicator, and to effect this the indicators are brought together at the above-named numbers, as shown in dotted lines, and upon pressing the indicators down upon the map the dot or circle indicating the location of Woodville will appear as the apex of the angle formed between the upper edges of the indicators. The same procedure obtains when a county is to be located.

From the foregoing description it will be seen that to operate the indicators of this invention will require no stretching of the arms, the point sought being generally found by inward movement of the indicators and not outward movement.

In use the device of this invention will be positive in operation for the purpose designed and may be successfully employed by any person who is able to read.

If preferred, suitable descriptive matter may be associated with either of the tables to explain how the indicators are to be employed, and as this will be readily understood detailed illustration is deemed unnecessary.

Having thus fully described my invention, what I claim as new, and desire to secure by Letters Patent, is—

1. The combination with a map, of location-indicators adapted to be moved to and from each other, each bearing distinguishable designations, any known two of which by being brought to register, will cause the point to be located to appear at the apex of the angle formed by the intersection of the indicators.

2. The combination with a map, of location-indicators adapted to be moved to and from each other, each bearing numbered divisions, any known two of which by being brought to register, will cause the point to be located to appear at the apex of the angle formed by the intersection of the indicators.

3. A map having different localities or points indicated by rows of figures arranged on tables bearing the names of the different localities or points, and location-indicators bearing numbered divisions corresponding to the numbers on the tables.

4. A map having different localities and points indicated by rows of figures referring to the east and west sides of the map, said figures being arranged on tables bearing the names of the different localities or points, and location-indicators bearing numbered divisions corresponding to the numbers on the tables, and a character or name referring to the east and west sides of the map.

In testimony that I claim the foregoing as my own I have hereto affixed my signature in the presence of two witnesses.

JOHN F. MAYES.

Witnesses:
JNO. S. HENDERSON,
J. W. ELLETT.